(12) United States Patent
Bouchard et al.

(10) Patent No.: US 7,334,331 B2
(45) Date of Patent: Feb. 26, 2008

(54) METHODS AND APPARATUS FOR MACHINING COMPONENTS

(75) Inventors: Eric Bouchard, Bromont (CA); Michael Anthony Umney, Oregonia, OH (US); Robert Allan Ahti, Hillsborough, NH (US)

(73) Assignee: General Electric Company, Schenectady, NY (US)

( * ) Notice: Subject to any disclaimer, the term of this patent is extended or adjusted under 35 U.S.C. 154(b) by 444 days.

(21) Appl. No.: 10/740,070

(22) Filed: Dec. 18, 2003

(65) Prior Publication Data
US 2005/0132570 A1 Jun. 23, 2005

(51) Int. Cl.
B23P 15/04 (2006.01)
(52) U.S. Cl. ............ 29/889.23; 29/889.2; 29/559; 29/33 R; 269/86; 269/270; 269/909
(58) Field of Classification Search ............ 29/559, 29/889.7, 889.21, 889.22, 889.23, 33 R, 29/889.2; 269/47, 909, 86, 266, 270, 254 R
See application file for complete search history.

(56) References Cited

U.S. PATENT DOCUMENTS

| | | | | |
|---|---|---|---|---|
| 3,881,397 A | * | 5/1975 | Saari ........................ 409/289 |
| 4,537,538 A | * | 8/1985 | Mitamura et al. .......... 409/217 |
| 5,191,711 A | * | 3/1993 | Vickers et al. ........... 29/889.21 |
| 5,350,279 A | * | 9/1994 | Prentice et al. ......... 416/220 R |
| 5,511,308 A | * | 4/1996 | Ng et al. .................. 29/889.1 |
| 5,544,873 A | * | 8/1996 | Vickers et al. ............... 269/47 |
| 5,867,885 A | * | 2/1999 | Bales et al. .................. 29/559 |
| 6,158,104 A | * | 12/2000 | Roberts et al. .............. 29/446 |
| 6,375,429 B1 | | 4/2002 | Halila et al. |
| 6,560,890 B1 | * | 5/2003 | Madge et al. ................ 33/549 |
| 6,561,764 B1 | * | 5/2003 | Tiemann .................. 416/96 R |
| 6,565,322 B1 | * | 5/2003 | Lieser et al. ............ 416/219 R |
| 6,820,468 B2 | * | 11/2004 | Powers et al. ............... 73/49.7 |
| 6,830,240 B2 | * | 12/2004 | Jones et al. .................. 269/32 |
| 6,844,515 B2 | * | 1/2005 | Byrnes et al. ........... 219/69.11 |
| 6,884,028 B2 | * | 4/2005 | Brauer et al. ............. 415/173.7 |
| 7,052,379 B2 | * | 5/2006 | Burgess ..................... 451/231 |
| 2004/0055134 A1 | * | 3/2004 | Jones et al. .................. 29/464 |
| 2004/0244180 A1 | * | 12/2004 | Jones et al. .................. 29/559 |
| 2005/0091846 A1 | * | 5/2005 | Powers et al. ............. 29/889.1 |
| 2005/0268461 A1 | * | 12/2005 | Ouellette et al. .......... 29/889.7 |
| 2006/0059676 A1 | * | 3/2006 | Jones et al. .................. 29/464 |

* cited by examiner

*Primary Examiner*—Essama Omgba
(74) *Attorney, Agent, or Firm*—William Scott Andes; Armstrong Teasdale LLP

(57) ABSTRACT

A method of using a machining assembly to machine a plurality of different turbine components that include a dovetail having a contoured profile. The method includes removably coupling a first set of retainers into the machining assembly, the first set of retainers include an upper portion having a profile that substantially mirrors a portion of the first dovetail, and a lower portion having a profile that substantially mirrors an opposite side of the first dovetail, coupling a first turbine component between the upper and lower portions such that the first turbine component is secured by the first set of retainers, coupling the machining assembly into a milling machine, and machining at least one seal groove into the dovetail of the first turbine component.

14 Claims, 7 Drawing Sheets

METHODS AND APPARATUS FOR MACHINING COMPONENTS

BACKGROUND OF THE INVENTION

This invention relates generally to gas turbine engines, and more specifically to methods and apparatus for machining gas turbine engine components.

Accurate manufacturing of a component may be a significant factor in determining a fabricating time of the component. Specifically, when the component is a gas turbine engine blade, accurate manufacturing of the blade may be one of the most significant factors affecting an overall cost of fabrication of the gas turbine engine, as well as subsequent modifications, repairs, and inspections of the blade. For example, at least some known gas turbine engines include a compressor for compressing air which is mixed with a fuel and channeled to a combustor wherein the mixture is ignited within a combustion chamber for generating hot combustion gases. At least some known compressors include a rotor assembly that includes at least one row of circumferentially spaced rotor blades. Each rotor blade includes an airfoil that includes a pressure side, and a suction side connected together at leading and trailing edges. Each airfoil extends radially outward from a rotor blade platform. Each rotor blade also includes a dovetail that extends radially inward from a shank coupled to the platform. The dovetail is used to mount the rotor blade within the rotor assembly to a rotor disk or spool.

During operation, a pressure differential is created between the compressor blade pressure side and the compressor blade suction side which may result in an undesirable leakage flow between the upstream and downstream portions of the rotor. One such possible leakage path may form at an interconnection between each rotor blade and the rotor disk, where a gap may be defined between a blade base member, usually a dovetail design, and a rotor disk groove in which the rotor blades are carried. Accordingly, in at least some gas turbine engines small diameter seal wires are inserted between the blade platform and the outer periphery of the rotor disk to facilitate sealing the upstream and downstream areas at the interconnection formed between each rotor blade and the rotor disk. The seal wires are split and as such, may expand in a radial direction when subjected to centrifugal force. Seal wires facilitate minimizing leakage gas flow from the high-pressure region of the flow path to the low-pressure region, and thereby maintain the maximum mass flow of the gas flow stream to maintain the operating efficiency of the engine.

At least some known methods of fabricating a seal wire groove include fabricating a machining assembly that includes a plurality of individual components permanently coupled, for example by bolting the components to the assembly, to enable a groove to be machined in a specific set of compressor blades. For example, during fabrication, the machining assembly is installed in a milling machine and a plurality of test cuts are performed on the blade to verify the alignement of the retainers. The seal wire groove is then machined into the compressor blades. The machining assembly is then removed from the milling machine and the individual components are then unbolted from the machining assembly and a second set of components is bolted. The machining assembly is then re-installed in the milling machine and a plurality of test cuts are performed on the blade to verify that the machining assembly is properly aligned for the second time. A seal wire groove is then machined into a second set of compressor blades installed on a second compressor rotor section. This process is repeated until all the compressor blades for each compressor rotor section have been machined.

Removing the machining assembly from the milling machine and re-installing separate components for each set of compressor blades is a relatively labor intensive process since each holding fixture must be installed on the milling machine prior to cutting the seal wire groove in the next set of blades. Additionally, an increased quantity of milling cutters are used to perform the test cuts and to machine the seal wire groove. Since the method for cutting a seal wire groove is relatively complex, at least one known manufacturer machines a plurality of seal grooves without changing the holding fixture to faciliate reducing costs of fabrication. Accordingly, the manufacturer may often produce a quantity of blades that is in excess of the quantity desired by the customer.

BRIEF DESCRIPTION OF THE INVENTION

In one aspect, a method of using a machining assembly to machine a plurality of different turbine components that include a dovetail having a contoured profile is provided. The method includes removably coupling a first set of retainers into the machining assembly, the first set of retainers include an upper portion having a profile that substantially mirrors a portion of the first dovetail, and a lower portion having a profile that substantially mirrors an opposite side of the first dovetail, coupling a first turbine component between the upper and lower portions such that the first turbine component is secured by the first set of retainers, coupling the machining assembly into a milling machine, and machining at least one seal groove into the dovetail of the first turbine component.

In another aspect, an assembly for machining a seal wire groove into a gas turbine rotor blade that includes a dovetail is provided. The assembly includes a base portion, a body portion coupled to the base portion, and a first set of retainers removably coupled to the body portion, the first set of retainers including an upper portion having a profile that substantially mirrors a portion of the first dovetail, and a lower portion having a profile that substantially mirrors an opposite side of the first dovetail.

In a further aspect, a milling machine is provided. The milling machine includes an assembly for machining a seal wire groove into a gas turbine rotor blade that includes a dovetail. The assembly includes a base portion, a body portion coupled to the base portion, and a first set of retainers removably coupled to the body portion, the first set of retainers including an upper portion having a profile that substantially mirrors a portion of the first dovetail, and a lower portion having a profile that substantially mirrors an opposite side of the first dovetail, and a grinding wheel configured to machine at least one seal wire groove into the dovetail.

DETAILED DESCRIPTION OF THE INVENTION

As used herein, the terms "manufacture" and "manufacturing" may include any manufacturing process. For example, manufacturing processes may include grinding, finishing, polishing, cutting, machining, inspecting, and/or casting. The above examples are intended as exemplary only, and thus are not intended to limit in any way the definition and/or meaning of the terms "manufacture" and "manufacturing". In addition, as used herein the term "component" may include any object to which a manufacturing process is applied. Furthermore, although the invention is described herein in association with a gas turbine engine, and more specifically for use with a compressor blade for a gas turbine engine, it should be understood that the present invention may be applicable to any component and/or any manufacturing process. Accordingly, practice of the present invention is not limited to the manufacture of compressor blades or other components of gas turbine engines.

Figure 1:
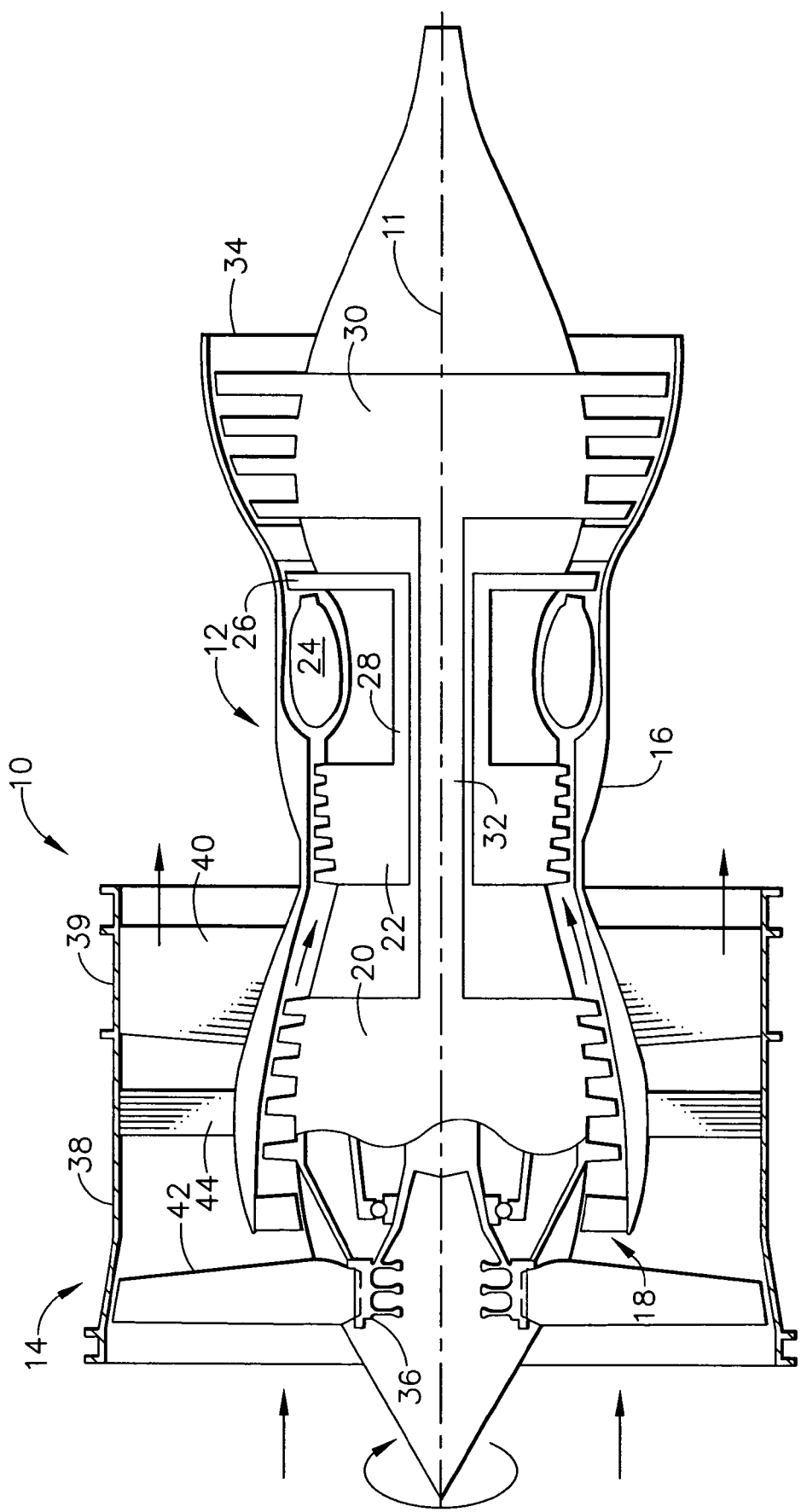
FIG. 1 is a schematic illustration of a gas turbine engine.

FIG. 1 is a schematic illustration of a gas turbine engine 10 having a longitudinal axis 11, and including a core gas turbine engine 12 and a fan section 14 positioned upstream of core engine 12. Core engine 12 includes a generally tubular outer casing 16 that defines an annular core engine inlet 18. Casing 16 surrounds a low-pressure booster 20 for raising the pressure of the incoming air to a first pressure level. In one embodiment, engine 10 is a CFM56 engine available from General Electric Aircraft Engines, Cincinnati, Ohio.

A high pressure, multi-stage, axial-flow compressor 22 receives pressurized air from booster 20 and further increases the pressure of the air to a second, higher pressure level. The high pressure air flows to a combustor 24 and is mixed with fuel. The fuel-air mixture is ignited to raise the temperature and energy level of the pressurized air. The high energy combustion products flow to a first turbine 26 for driving compressor 22 through a first drive shaft 28, and then to a second turbine 30 for driving booster 20 through a second drive shaft 32 that is coaxial with first drive shaft 28. After driving each of turbines 26 and 30, the combustion products leave core engine 12 through an exhaust nozzle 34 to provide propulsive jet thrust.

Fan section 14 includes a rotatable, axial-flow fan rotor 36 that is driven by second turbine 30. An annular fan casing 38 surrounds fan rotor 36 and is supported from core engine 12 by a plurality of substantially radially-extending, circumferentially-spaced support struts 44. Fan rotor 36 carries a plurality of radially-extending, circumferentially spaced fan blades 42. Fan casing 38 extends rearwardly from fan rotor 36 over an outer portion of core engine 12 to define a secondary, or bypass airflow conduit. A casing element 39 that is downstream of and connected with fan casing 38 supports a plurality of fan stream outlet guide vanes 40. The air that passes through fan section 14 is propelled in a downstream direction by fan blades 42 to provide additional propulsive thrust to supplement the thrust provided by core engine 12.

Figure 2:
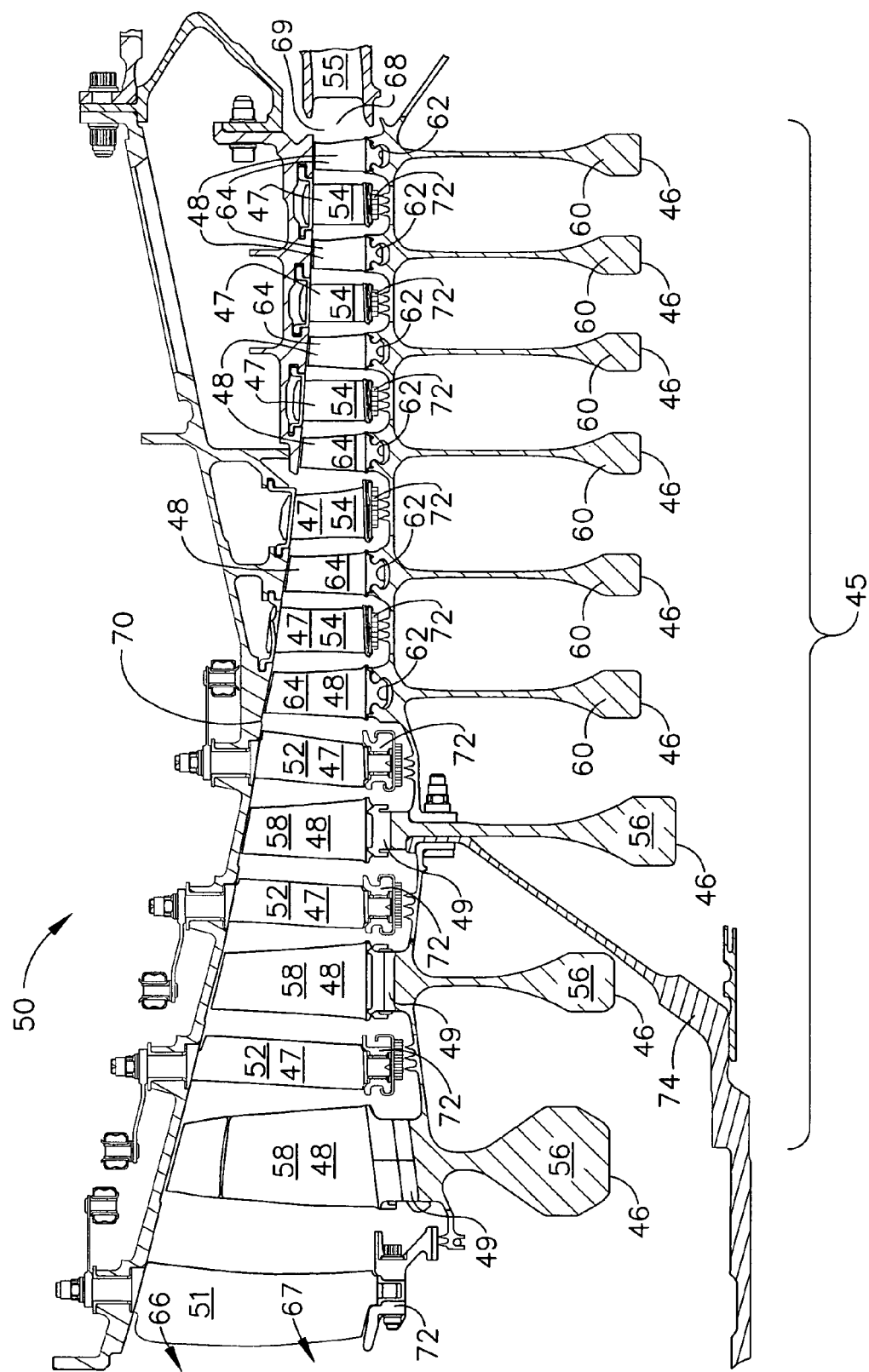
FIG. 2 is a cross-sectional view of compressor 14 shown in FIG. 1.

FIG. 2 is a cross-sectional view of a portion of a compressor 50 that may be used with core gas turbine 12 (shown in FIG. 1). In the exemplary embodiment, compressor 50 includes nine stages 45, wherein each stage 46 includes an array of radially-extending, circumferentially-spaced stator vanes 47 and a plurality of peripherally-carried, radially-extending, circumferentially-spaced rotor blades 48. Inlet guide vanes 51 and stator vanes 52 of stages one through three of compressor 50 are variable in that they are pivotable about an axis that extends radially relative to the compressor axis of rotation. Stator vanes 54 of stages four through eight and outlet guide vanes 55 are fixed in position. Additionally, in stages one through three the respective rotor disks 56 include a series of peripherally-spaced, axially-extending dovetail slots 49 into which rotor blades 58 are inserted and from which rotor blades 58 are removed in an axial direction. Rotor disks 60 for stages four through nine, on the other hand, each have a single, circumferentially-extending dovetail slot 62, into which rotor blades 64 are inserted in a generally tangential direction relative to rotor disk 60.

Compressor 50 includes an inlet 66 that defines a flow passageway 67 having a relatively large flow area, and an outlet 68 that defines a relatively smaller area flow passageway 69 through which the compressed air passes. An outer boundary of the flow passageway is defined by an outer annular casing 70 and an inner boundary of the flow passageway is defined by the blade platforms of respective blades 58, 64 carried by rotors 56, 60, and also by a stationary annular seal ring 72 that is carried at an inner periphery of each of the respective stator sections 52, 54. As shown, respective rotor disks 56, 60 are ganged together by a suitable disk-to-disk coupling arrangement (not shown), and the third stage disk is connected with a drive shaft 74 that is operatively connected with a turbine rotor (not shown).

Each stator section 52, 54 includes an annular abradable seal that is carried by a respective annular sealing ring 72 and that is adapted to be engaged by respective labyrinth seals carried by 56, 60 in order to minimize air leakage around the respective stators 52, 54. Sealing rings 72 also serve to confine the flow of air to the flow passageway defined by outer casing 70 and the radially innermost surfaces of the respective stator vanes 47.

Figure 3:
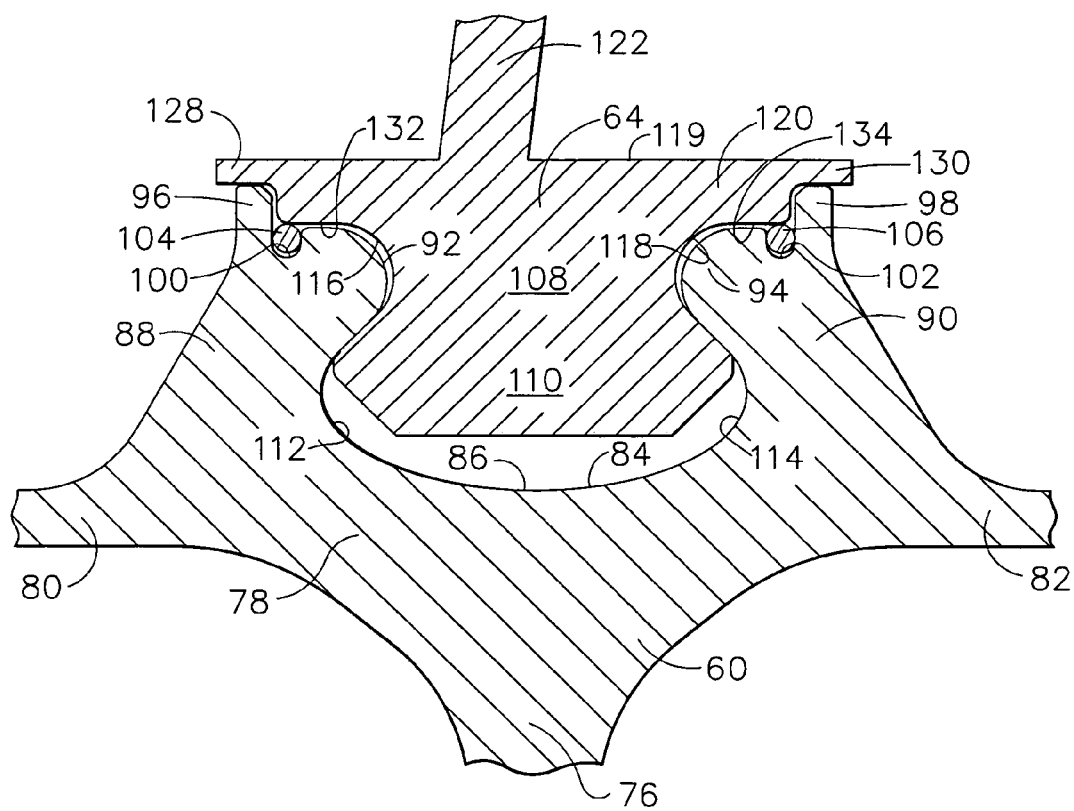
FIG. 3 is a perspective view of an exemplary gas turbine engine blade.

FIG. 3 is an end view of a rotor blade 64 coupled to rotor disk 60. Rotor disk 60 includes a plate-like disk body 76 that terminates in an enlarged outer rim 78. Outer rim 78 includes a forward axial ring 80 and an aft axial ring 82 that each extend in a generally axial direction of engine 10 to engage with corresponding forward and aft axial rings 80, 82 of adjacent rotor disks 60 to provide a direct, driving interconnection between the respective rotor disks 56, 60 so that they all rotate together. Outer rim 78 also includes a rotor-blade-receiving circumferential slot 84 that in the exemplary embodiment is substantially U-shaped. Slot 84 has a cross-sectional form of a dovetail, and includes a slot base 86. Slot 84 is defined by a forward sidewall 88 and an aft sidewall 90 that are spaced axially from each other and that extend in a generally radial direction. Each of forward and aft sidewalls 88, 90 has a respective inward convex projection 92, 94 that defines a generally dovetail-type shape of slot 84. Additionally, each slot sidewall 88, 90 includes a radially-extending flange 96, 98. Positioned between each radial flange 96, 98 and the corresponding inward convex projection 92, 94, there is provided a recessed seal wire groove 100, 102 sized to receive a respective seal wire 104, 106 that has a substantially circular cross-section. In an alternative embodiment, seal wire 104, 106 has a substantially noncircular cross-section. Seal wires 104, 106 are split and have a predetermined length (not shown) such that they extend substantially circumferentially within seal wire grooves 100, 102. An axial width of each groove 100, 102 is selected to enable wires 104, 106 to be slidably received therein, and each groove 100, 102 has a depth in the radial direction that is at least as deep as diameter of each seal wire 104, 106.

Rotor blade 64 includes a base member 108 that has a shape that corresponds substantially with that of circumferential slot 84. Base member 108 as shown is in the form of a dovetail and includes an enlarged base portion 110 that is received in lateral recesses 112, 114 formed in rotor slot 84. Base member 108 also includes a recessed portion 116, 118 on each side to receive the inwardly-extending convex projections 92, 94 of rotor slot 84. A blade platform 120 is carried on base member 108 and extends in a generally transverse direction relative to the longitudinal axis of base member 108.

Extending longitudinally from upper surface 119 of blade platform 120, and in a direction opposite to that of base member 108, is an airfoil portion 122, which is adapted to contact the gases that pass through engine 10. Platform 120 also includes a pair of axially-spaced lower surfaces 132, 134 each having a respective concave recess 116, 118 respectively, that is axially aligned with corresponding disk grooves 100, 102 to receive and to engage with respective seal wires 104, 106. Concave recesses 116, 118 are configured to facilitate surface-to-surface contact between blade platform 120 and seal wires 104, 106, rather than line contact therebetween, thereby reducing the localized compressive stresses to which forward and aft blade platform lower faces 132, 134 are subjected during engine operation. Blade platform 120 terminates at a forward axial extension 128 and at an aft axial extension 130 that each overlie a respective forward and aft radial flange 96, 98 carried by rotor disk 60.

Seal wires 104, 106 contact the respective platform lower faces 132, 134, and also contact a portion of respective seal wire grooves 100, 102 formed in rotor disk 60. Thus, by virtue of the dual points of contact provided by seal wires 104, 106, with the blade platform and with the rotor disk, a substantially continuous gas leakage flow path that would otherwise exist by virtue of the gap defined between blade base member 108 and rotor circumferential slot 84 is effectively blocked and closed when seal wires 104, 106 are in contact with each of those respective surfaces.

Figure 4:
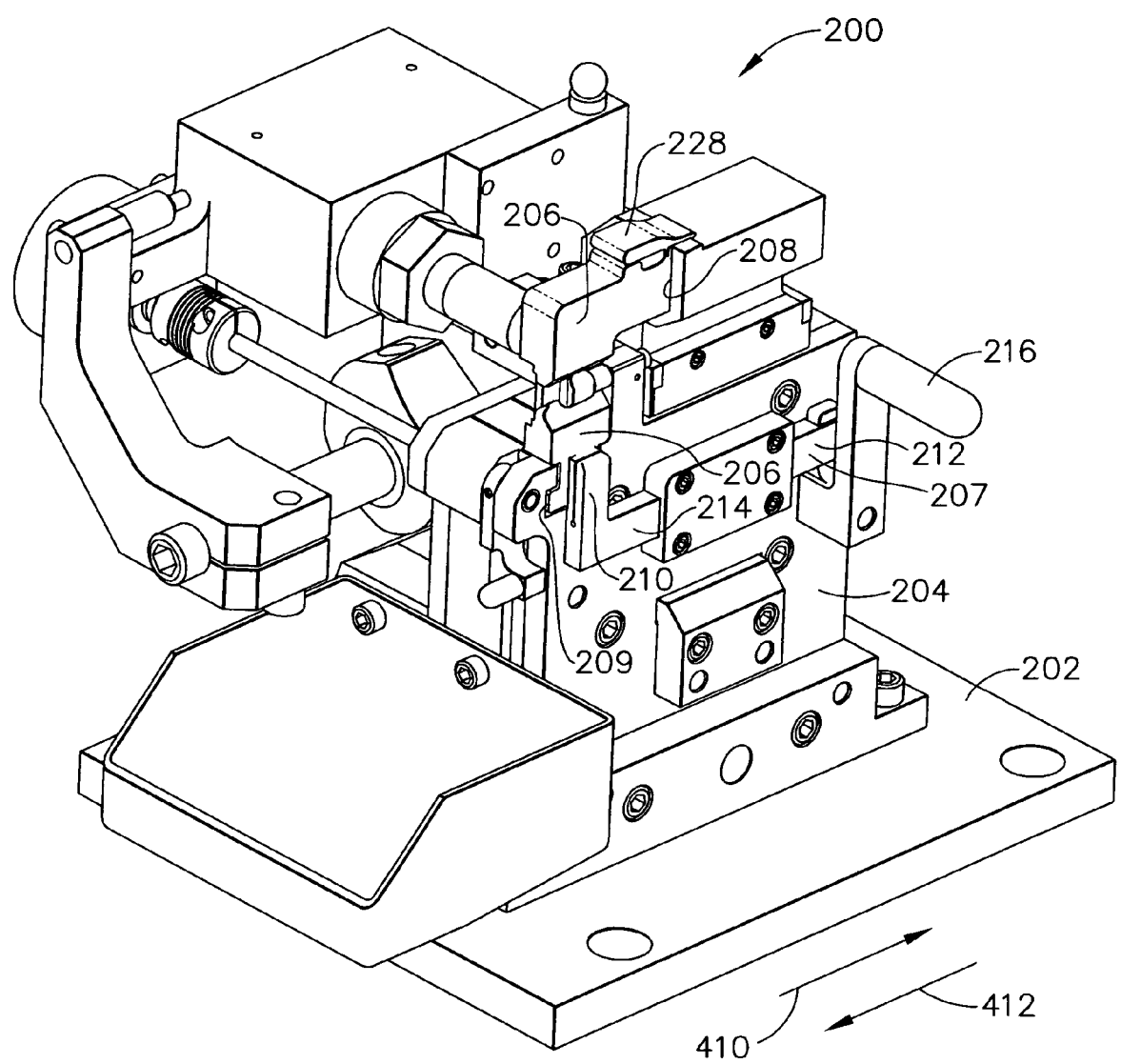
FIG. 4 is a perspective view of an exemplary machining assembly for securing a component, such as the gas turbine engine blade shown in FIG. 3, in position during manufacture.
Figure 5:
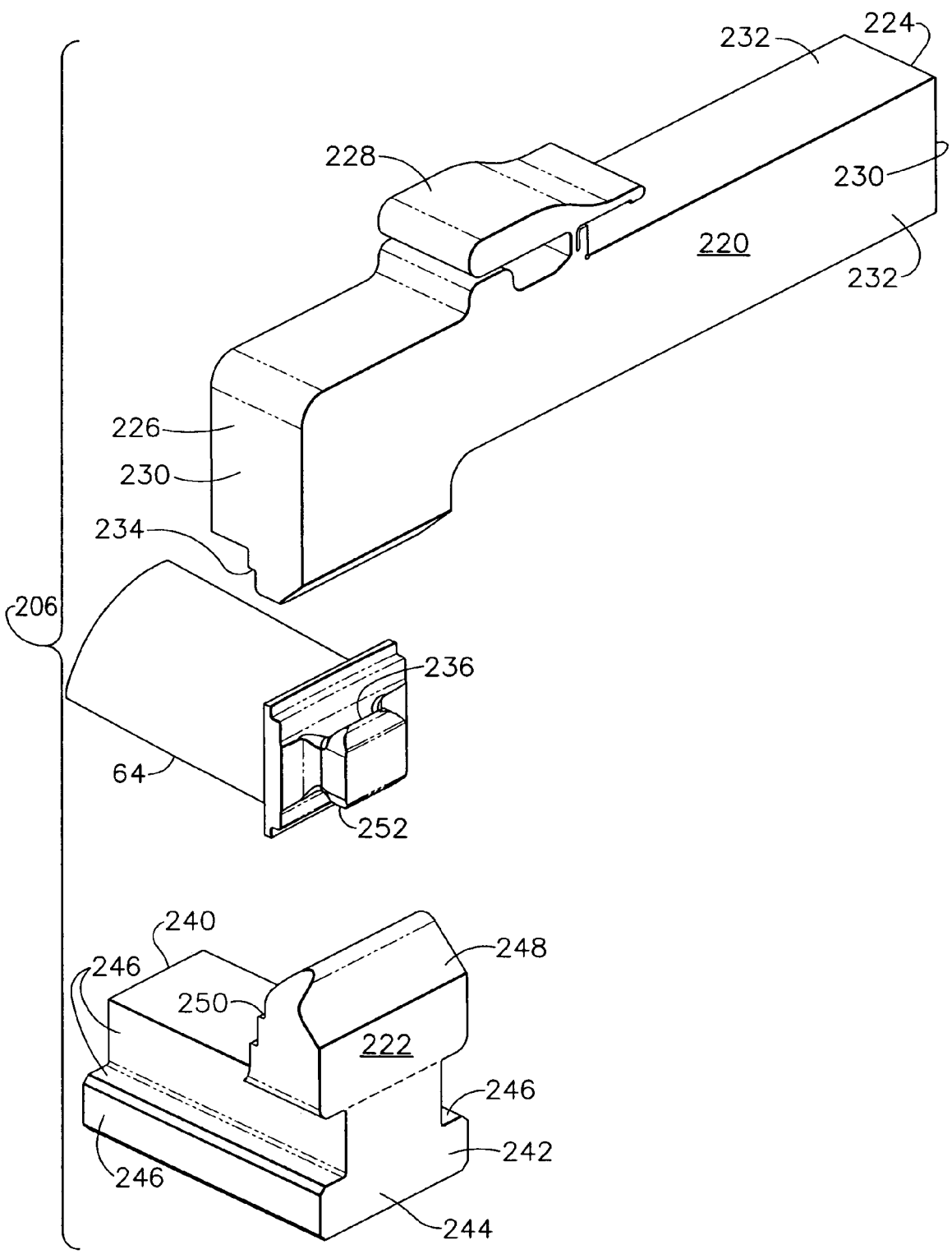
FIG. 5 is a perspective view of a first set of retainers that may be used with the machining assembly shown in FIG. 4.

FIG. 4 is a machining assembly 200 that may be used to machine wire seal grooves in a rotor blade such as blade 64 (shown in FIG. 3). FIG. 5 is a perspective view of a portion of machining assembly 200. Machining assembly 200 includes a base portion 202, a body portion 204 coupled to base portion 202, and a first set of retainers 206 slidably coupled to base portion 202. Body portion 204 also includes a locking mechanism 207 that is coupled to body portion 204, a first opening 208, and a second opening 209. Locking mechanism 207 includes a first end 210, a second end 212, and a central portion 214 that couples first end 210 to second end 212. Locking mechanism 207 also includes a handle 216 coupled to second end 212.

As shown in FIG. 5, each set of retainers 206 includes an upper portion 220 and a lower portion 222. Upper portion 220 includes a first end 224, a second end 226, and a locking mechanism 228. First end 224 has a cross-sectional profile 230 defined by a plurality of external surfaces 232. In the exemplary embodiment, first end 224 has a substantially rectangular cross-sectional geometric profile that is substantially similar to a cross-sectional profile of opening 208. Second end 226 includes a retaining portion 234. In the exemplary embodiment, retaining portion 234 has cross-sectional profile that is substantially equivalent to a cross-sectional profile of a blade upper surface 236.

Lower portion 222 includes a first end 240 and a second end 242. First end 240 and second end 242 each having a cross-sectional profile 244 defined by a plurality of external surfaces 246. In the exemplary embodiment, first end 240 and second end 242 each have a substantially T-shaped cross-sectional profile 244 that is substantially similar to a cross-sectional profile of opening 209. Lower portion 222 also includes a lower second portion 248 extending from second end 242. Lower second portion 248 includes a retaining portion 250 that has a cross-sectional profile that is substantially equivalent to, i.e., mirrors, a cross-sectional profile of a blade lower surface 252.

Figure 6:
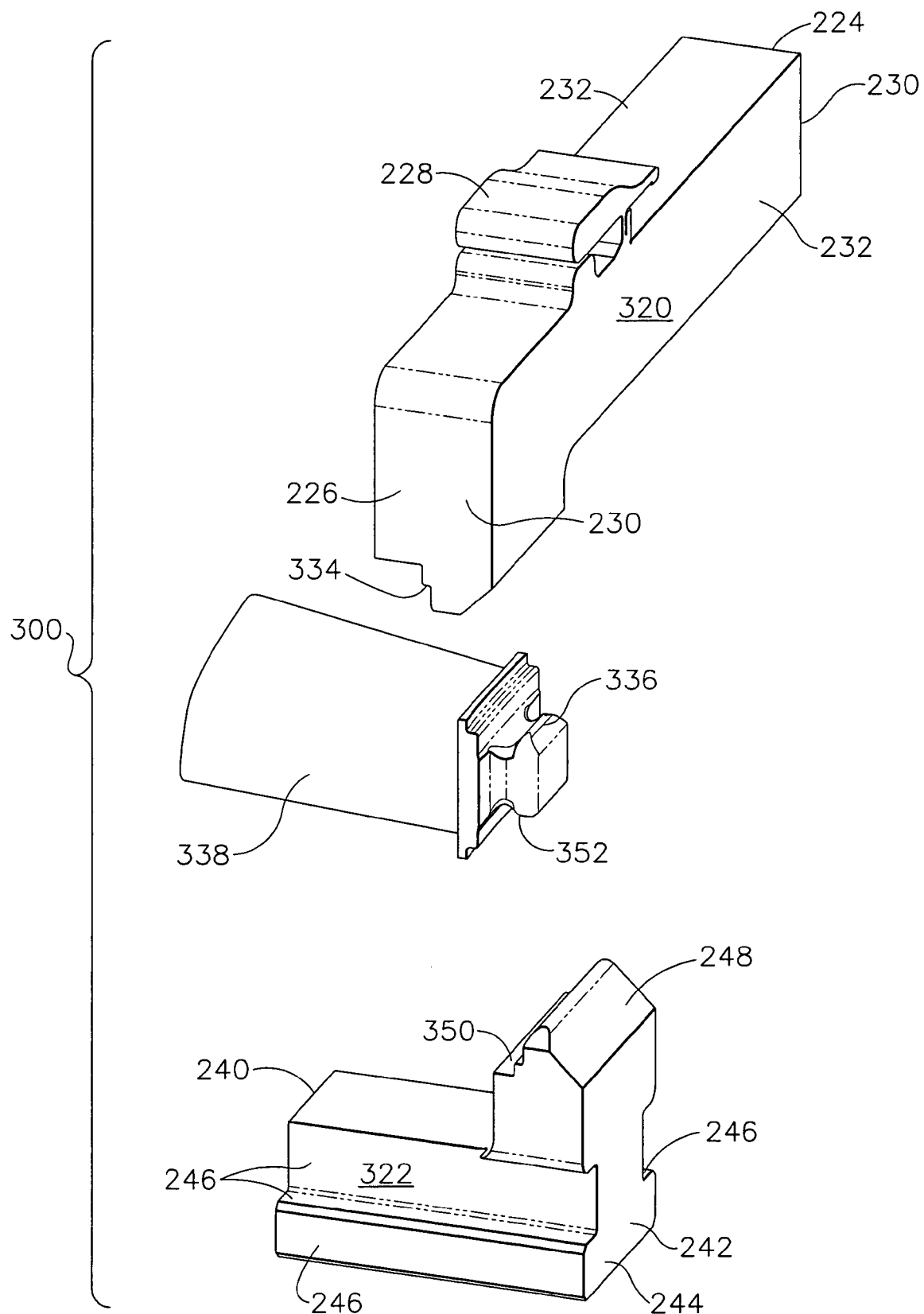
FIG. 6 is a perspective view of a second set of retainers that may be used with the machining assembly shown in FIG. 4.

FIG. 6 is a perspective view of a portion of machining assembly 200 (shown in FIG. 4) including a second set of retainers 300 that are configured to secure a second exemplary blade 338. Retainers 300 are substantially similar to retainers 206, (shown in FIG. 5) and components of retainers 206 that are identical to components of retainers 300 are identified in FIG. 6 using the same reference numerals used in FIG. 5.

Retainers 300 include an upper portion 320 and a lower portion 322. Upper portion 320 includes a first end 224, a second end 226, and a locking mechanism 228. First end 224 has a cross-sectional profile 230 defined by a plurality of external surfaces 232. In the exemplary embodiment, first end 224 has a substantially rectangular cross-sectional geometric profile. Second end 226 includes a retaining portion 334. In the exemplary embodiment, retaining portion 334 has cross-sectional profile that is substantially equivalent to a cross-sectional profile of a blade upper surface 336.

Lower portion 322 includes a first end 240 and a second end 242. First end 240 and second end 242 each have a cross-sectional profile 244 defined by a plurality of external surfaces 246. In the exemplary embodiment, first end 240 and second end 242 each have a substantially T-shaped cross-sectional profile 244. Lower portion 222 also includes a lower second portion 248 extending from second end 242. Lower second portion 248 includes a retaining portion 350 that has a cross-sectional profile that is substantially equivalent to a cross-sectional profile of a blade lower surface 352.

Figure 7:
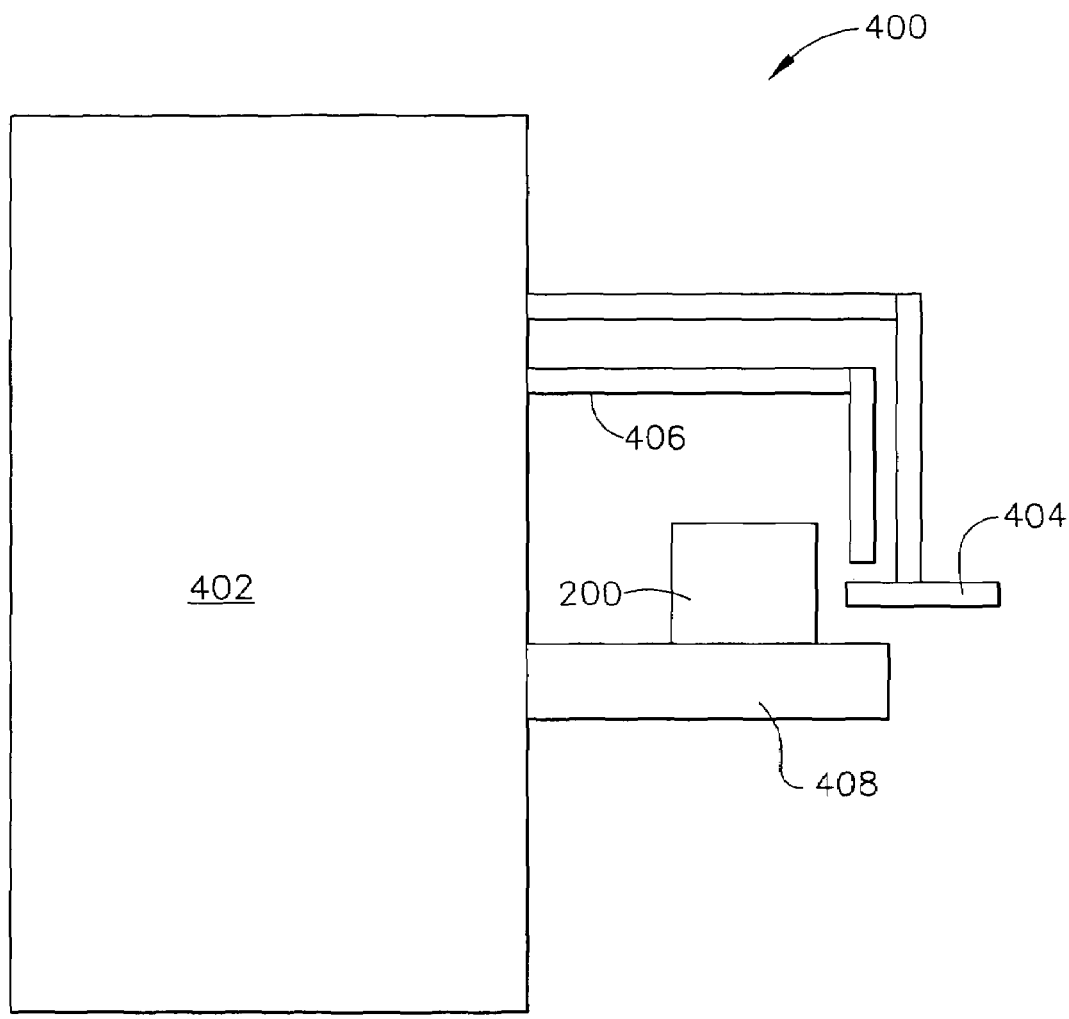
FIG. 7 is a side view of an exemplary milling system 400 that may be used with machining assembly 200 shown in FIG. 4.

FIG. 7 is a side view of an exemplary milling system 400 that may be used with machining assembly 200 (shown in FIG. 4). Milling system 400 includes a milling machine 402, and a grinding wheel 404 for use with milling system 400. In the exemplary embodiment, grinding wheel 404 is fabricated from a cubic boron nitride (CBN) material. A coolant passage 406 extends from milling machine 402 such that a coolant, passing through coolant passage 406 is applied to a rotor blade, positioned within machining assembly 200, during milling operation.

In operation, machining assembly 200 is coupled to a table 408 of milling machine 402. A set of retainers is selected by an operator depending on the rotor blade to be machined. For example, to machine a seal wire groove in blade 64, mounted on rotor disk 56, an operator may select retainers 206. To machine a seal wire on a second blade, such as blade 64 mounted on rotor disk 60, an operator may select retainers 300. It should be realized that each set of blades mounted on each individual rotor, have a specific set of retainers sized to hold the respective blade in a substantially fixed position while machining the seal wire groove in the blades.

Accordingly, an operator couples machining assembly 200 to milling machine 402. An operator then selects the appropriate sized retainers based on the rotor blades to be machined. In one embodiment, the operator selects retainers 206. Lower portion 222 is then inserted into opening 209 of body portion 204. After lower portion 222 is inserted into body portion 204, locking mechanism 208 is moved in a first direction 410 until lower portion 222 is substantially secured within body portion 204. A rotor blade having a lower surface and an upper surface substantially similar to the respective lower portion retaining surface 250 and upper portion retaining surface 234 is positioned adjacent lower portion 222. Upper portion first end 224 is then inserted into opening 208 of body portion 204 until locking mechanism 228 is coupled to machining assembly 200 thus securing the rotor blade between lower portion 222 and upper portion 224.

Milling machine 402 is then energized, thus causing grinding wheel 404 to rotate and cooling liquid to flow from milling machine 402 to grinding wheel 404. The operator repositions the grinding wheel such that at least one seal wire groove is machined into a base of the rotor blade. To machine a second blade from the same rotor disk as the first blade, the operator depresses locking mechanism 228 and slides the locking mechanism in a second direction 412, opposite first direction 410 until upper portion 220 is removed from body 204. The operator then positions the second rotor blade adjacent the lower 222 and inserts upper portion 220 into opening 208 until locking mechanism 228 is coupled to body 204.

To machine a rotor blade on a second rotor disk, different than the first rotor disk, an operator selects a second appropriately sized set of retainers based on the rotor blades to be machined. In one embodiment, the operator selects retainers 300. Lower portion 322 is then inserted into opening 209 of body portion 204. After lower portion 322 is inserted into body portion 204, locking mechanism 208 is moved in a first direction 410 until lower portion 322 is substantially secured within body portion 204. A rotor blade having a lower surface and an upper surface substantially similar to the respective lower portion retaining surface 350 and upper portion retaining surface 334 is positioned adjacent lower portion 322. Upper portion first end 224 is then inserted into opening 208 of machining assembly 200 until locking mechanism 228 is coupled to machining assembly 200 thus securing the rotor blade between lower portion 322 and upper portion 320.

Milling machine 402 is then energized, thus causing grinding wheel 404 to rotate and cooling liquid to flow from milling machine 402 to grinding wheel 404. The operator repositions the grinding wheel such that at least one seal wire groove is machined into a base of the rotor blade. This operation is repeated until all desired rotor blades have been machined to provide at least one seal wire groove.

The above-described machining assembly is cost-effective and highly reliable. The machining assembly includes a CBN grinding wheel coupled to a milling machine. The machining assembly also includes a plurality of sets of retainers, wherein each set of retainers is configured to maintain a specific set of rotor blades. Specifically, each rotor includes a set of blades having a specific base profile and each set of retainers are configured to include retaining surfaces approximately matching the blade base. Accordingly, to machine a second set of blades on a second rotor, an operator must replace only the set of retainers, i.e. the upper and lower portions, in order to machine another set of rotor blades from a different rotor. Thus, the machining assembly facilitates efficient and uniform machining of a plurality of blades from different rotors, while only requiring an operator to remove and replace two individual parts of the machining assembly.

Moreover, the above described milling machine facilitates providing an adaptable holding fixture which may be re-configured to accept any of the six part numbers within 30 seconds to substantially reduce a set-up time for machining seal wire grooves in a rotor blade. Specifically, quick change modules, i.e. holding fixture sets, are removed and reinstalled using only the operators fingers and built in extraction devices and locking devices. The body of the machining assembly remains in place at all times, thus eliminating re-alignments and test cuts. Secondly, using a plated CBN grinding wheel which includes the required seal wire groove geometry facilitates producing highly accurate geometry on the compressor blade at a significantly reduced cost. Thirdly, a lightweight and relatively inexpensive and extremely compact milling machine may be used to machine seal wire grooves into the rotor blades, instead of using a relatively large and expensive milling machine. Therefore, smaller milling machines may be placed closely together and grouped for one piece flow, thus eliminating inventory build up common to batch process.

While the invention has been described in terms of various specific embodiments, those skilled in the art will recognize that the invention may be practiced with modification within the spirit and scope of the claims.

What is claimed is:

1. An assembly for machining a seal wire groove into a gas turbine rotor blade that includes a dovetail, said assembly comprising:
    a base portion;
    a body portion coupled to said base portion;
    a first set of retainers removably coupled to said body portion, said first set of retainers comprising an upper portion having a profile that substantially mirrors a portion of a first dovetail, and a lower portion having a profile that substantially mirrors an opposite side of the first dovetail, wherein said first set of retainers slidably couple to said body portion, such that said first set of retainers can be replaced by a second set of retainers that are configured to retain a second dovetail that is different from the first dovetail; and
    a locking mechanism comprising a first end, a second end opposite said first end, a central portion that couples said first end to said second end, and a handle coupled to said second end, said locking mechanism configured to secure said lower portion within said body portion.

2. An assembly in accordance with claim 1 wherein said upper portion comprises a locking mechanism configured to secure said upper portion within said body portion.

3. An assembly in accordance with claim 1 wherein said body portion comprises:
    a first opening sized to receive said upper portion therein; and
    a second opening sized to receive said lower portion therein.

4. An assembly in accordance with claim 3 wherein said upper portion and said first opening each have a substantially rectangular cross-sectional profile.

5. An assembly in accordance with claim 3 wherein said lower portion and said second opening each have a substantially T-shaped cross-sectional profile.

6. An assembly in accordance with claim 1 wherein said second set of retainers is different than said first set of retainers, said second set of retainers comprising an upper portion having a profile that substantially mirrors a portion of the second dovetail, and a lower portion having a profile that substantially mirrors an opposite side of said second dovetail.

7. A milling machine comprising:
an assembly for machining a seal wire groove into a gas turbine rotor blade that includes a dovetail, said assembly comprising:
a base portion;
a body portion coupled to said base portion;
a first set of retainers removably coupled to said body portion, said first set of retainers comprising an upper portion having a profile that substantially mirrors a portion of a first dovetail, and a lower portion having a profile that substantially mirrors an opposite side of the first dovetail, wherein said first set of retainers slidably couple to said body portion, such that said first set of retainers can be replaced by a second set of retainers that are configured to retain a second dovetail that is different from the first dovetail;
a locking mechanism comprising a first end, a second end opposite said first end, a central portion that couples said first end to said second end, and a handle coupled to said second end, said locking mechanism configured to secure said lower portion within said body portion; and
a grinding wheel configured to machine at least one seal wire groove into said dovetail.

8. A milling machine in accordance with claim 7 wherein said assembly further comprises
a second locking mechanism coupled to said upper portion and configured to secure said upper portion within said body portion.

9. A milling machine in accordance with claim 7 wherein said body portion comprises:
a first opening sized to receive said upper portion therein; and
a second opening sized to receive said lower portion therein.

10. A milling machine in accordance with claim 9 wherein said upper portion and said first opening each have a substantially rectangular cross-sectional profile.

11. A milling machine in accordance with claim 9 wherein said lower portion and said second opening each have a substantially T-shaped cross-sectional profile.

12. A milling machine in accordance with claim 7 wherein said second set of retainers is different than said first set of retainers, said second set of retainers comprising an upper portion having a profile that substantially mirrors a portion of the second dovetail, and a lower portion having a profile that substantially minors an opposite side of said second dovetail.

13. A milling machine in accordance with claim 7 wherein said grinding wheel further comprises a cubic boron nitride (CBN) grinding wheel configured to machine two seal wire grooves into said dovetail.

14. A milling machine in accordance with claim 13 wherein said CBN grinding wheel comprises a cutting geometry that substantially mirrors a seal wire geometry.

* * * * *